Sept. 11, 1962    T. F. BROGAN ET AL    3,053,140
MEANS FOR DETECTING FAULTY EXPOSURE OF REVERSIBLE
MOTION PICTURE FILM MAGAZINES
Filed June 23, 1961
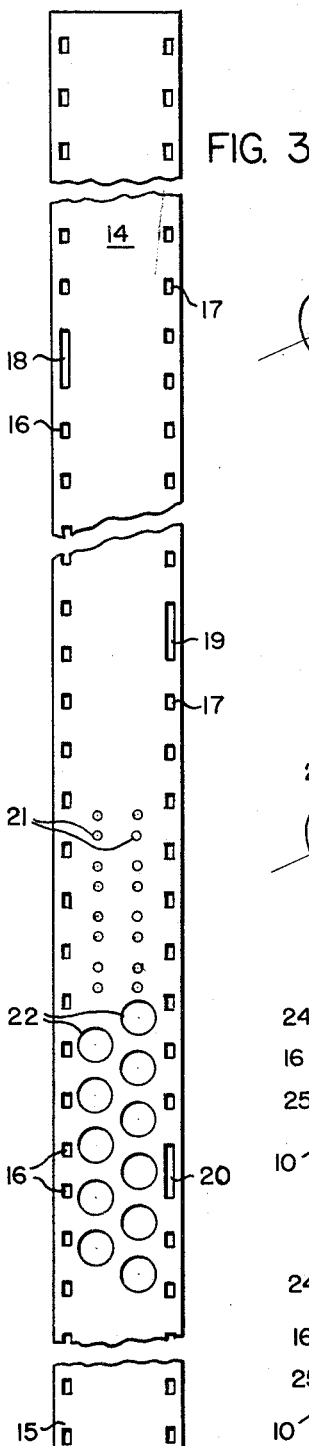
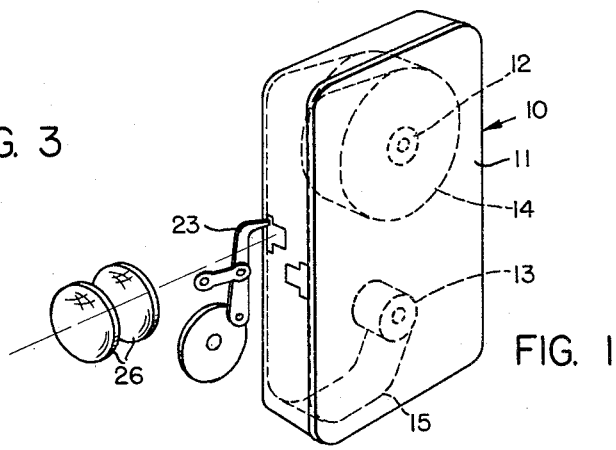
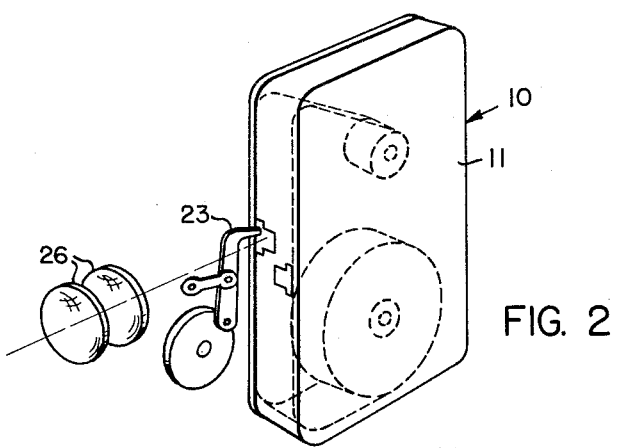
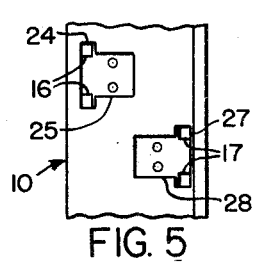
THOMAS F. BROGAN
WILLIAM J. KLEM
*INVENTORS*
BY R. Frank Smith
Armin B. Pagel
ATTORNEYS

United States Patent Office 3,053,140
Patented Sept. 11, 1962

3,053,140
MEANS FOR DETECTING FAULTY EXPOSURE OF REVERSIBLE MOTION PICTURE FILM MAGAZINES
Thomas F. Brogan and William J. Klem, Rochester, N.Y., assignors to Eastman Kodak Company, Rochester, N.Y., a corporation of New Jersey
Filed June 23, 1961, Ser. No. 119,185
6 Claims. (Cl. 88—16)

The present invention relates to reversible motion picture film magazines adapted to be loaded into a camera in a particular manner to expose a series of frames adjacent one edge of the film and then to be reversed in the camera to expose a second series of frames adjacent the other edge of the film. More particularly, the invention relates to such magazines including means associated with the film therein for visually indicating that the film in the magazine has been improperly exposed.

Motion-picture film magazines of the type described above are well known in the art and are generally loaded with 16 mm. film having perforations along both edges. Two parallel rows of exposures are made on this film and, by subsequently splitting the film during its processing, a single strip of 8 mm. film twice as long as the 16 mm. film and having perforations along only one edge is produced.

Prior to being exposed, the film in such a magazine is wound onto a supply core and attached at its leading end to an empty take-up core. When the unexposed magazine is properly loaded into a camera, a film advancing pawl in the camera engages the perforations along one edge of the film through an aperture in the magazine and moves the film past an exposure window in the magazine, aligned with the camera lens system, and toward the take-up core upon which the film is being wound. When almost the entire length of film has been wound onto the take-up core a discontinuity in the film perforations near the trailing end of the film comes into alignment with the feed pawl and prevents further advancing of the film. The magazine is then reversed in the camera to bring the feed pawl into engagement with the other row of perforations through a second opening in the magazine and to align the unexposed side of the film with the lens system through a second exposure window. The pawl now moves the film from the fully wound take-up core toward the now empty supply core until a second discontinuity in the perforations near the leading end of the film comes into alignment with the pawl. When all of the film between the discontinuities in the perforations has thus been exposed, the magazine is ready to be sent to the processor.

In order to facilitate the proper use of the magazine, one side thereof is marked "1st Side—This Side Up For First Exposure," and the opposite side is marked "2nd Side—This Side Up For Final Exposure," or with other similar wording.

A rather common occurrence when using such magazines, however, is for the operator to initially install the magazine in the camera in the reversed position so that the feed pawl moves the film toward, rather than away from, the supply core. With the magazine so installed in the camera, only a short length of film will be moved past the exposure window before the end of the film is reached. This error is herein referred to as a "second side first error." In many instances, after having made this error, especially if the camera was loaded for a considerable length of time prior to being used, the operator concludes that all of the film in the magazine has been exposed and sends the magazine to a processor to have the film therein developed. If the operator recognized his error, however, he could properly expose the film in the magazine by replacing the magazine in the camera in the proper manner and proceeding as described previously. With presently available magazines, however, the fact that a "second side first error" has been made and that the magazine is still loaded with unexposed film cannot be ascertained by inspection of the magazine until the film therein has been processed, and thereby rendered useless.

Another error occasionally encountered in use of such magazines occurs when a magazine is returned to the processor with the film therein still in its original position. This error is herein referred to as a "no-run" error, and may result either from a malfunctioning of the camera film advancing mechanism or simply from accidentally sending the magazine to the processor before it has been used. As in the case of a "second side first error," the occurrence of a "no-run" error does not of itself affect the unused film in the magazine, but, since the error likewise cannot be detected prior to processing, the loaded magazine cannot be returned or resold.

It is therefore the primary object of the present invention to provide a reversible motion picture film magazine with means whereby the occurrence of a "second side first error" or a "no-run" error may be detected without opening the magazine and/or processing the film therein.

Another object of the invention is to provide a simple means for detecting the occurrence of such errors without additional equipment so that such errors can be detected either by the operator himself or by the film processor. Still another object of the invention is to provide such error detection means by modifying film of the type customarily used in such magazines without necessitating any modification of the magazines themselves. Still another object of the invention is to provide such error detection means which are simple, inexpensive, and foolproof. Yet another object of the invention is to provide such error detection means which have no effect upon the proper exposure of the film after such an error has been made and detected.

These and other important objects will be more apparent by reference to the following drawings in which:

FIG. 1 is a perspective view of a reversible film magazine showing the film and film cores therein in broken lines and showing schematically the film pawl mechanism and the lens system of a camera, with the magazine properly installed in the camera prior to exposing any of the film therein;

FIG. 2 is a perspective view corresponding to FIG. 1 but showing the magazine loaded into the camera "second side first" prior to exposing any of the film therein;

FIG. 3 is a broken plan view of a strip of film provided with error detection means according to the preferred embodiment of the invention;

FIG. 4 is a partial front view of a magazine as shown in FIG. 1 provided with conventional film, with the film advancing perforations visible through the magazine windows;

FIG. 5 is a partial front view of a magazine as shown in FIG. 1 provided with film according to the present invention, prior to movement of the film in the magazine; and FIG. 6 is a partial front view of a magazine as shown in FIG. 1 provided with film according to the present invention after having been loaded and run "second side first."

Referring now to the drawings and more particularly to FIG. 1 the reversible magazine 10 comprises a box-like housing 11 with a film supply core 12 and a film take-up core 13 rotatably mounted therein. As illustrated, the as yet unexposed film 14 is initially wound upon core 12, with the leading end 15 thereof attached to core 13. For purposes of clarity the film guiding and film gate means in the magazine have not been illustrated.

To understand the operation of the magazine and the significance of the present invention, it is first necessary to understand the manner in which the magazine functions using conventional film. The film according to the present invention is shown in FIG. 3, and comprises a film strip 14 having a row of evenly spaced perforations 16 along one edge thereof and a second row of perforations 17 along the other edge thereof. An elongated slot 18 formed by removing the web between two or more adjacent perforations 16 is located near the trailing end of the film. Along the row of perforations 17 two similar elongated slots 19 and 20 are provided near the leading end of the film. In addition to the above mentioned perforations, "second side first" indicating perforations 22 are provided adjacent slot 20 and visibly distinguishable "no run" indicating perforations 21, which may be in the form of film identification numerals or symbols, are provided in the area between slot 19 and perforations 22. Since the only significant difference between the illustrated film and conventional film resides in the additional slot 20 and perforations 21 and 22, the operation of a magazine loaded with conventional film can be readily understood from the accompanying drawing by visualizing the film without these features and by assuming that the row of perforations 17 continues uninterrupted between elongated slot 19 and the leading end of the film.

As a magazine loaded with conventional film is initially loaded into the camera in the proper manner in the relation shown in FIG. 1, a feed pawl shown schematically at 23 is aligned with the pawl aperture portion 24 of exposure window 25 and engages perforations 16 in film 14 to move the film downwardly toward take-up core 13, bringing successive exposure areas of the film along perforations 16 into exposure position in alignment with the camera lens system 26. A rotating spindle, not shown, simultaneously rotates the take-up core to wind the film thereon as it is fed thereto. As previously described, when almost all of the film has been wound onto the take-up core, slot 18 is moved into alignment with pawl 23, thereby preventing the pawl from further advancing the film. The magazine is then reversed in the camera to bring pawl 23 into alignment with the pawl aperture portion 27 of the other exposure window 28 and into engagement with perforations 17. In this position the fully wound take-up core is positioned above the now empty supply core in engagement with the core rotating means of the camera mentioned previously. As the camera is now operated, the film is exposed as it is moved past window 28 aligned with the lens system 26, and is wound onto the supply core. When almost all of the film has been wound back onto the supply core, slot 19 moves into alignment with pawl 23 and further feeding is prevented.

Prior to any movement of the film therein, the magazine as viewed from the front presents the appearance illustrated in FIG. 4, with perforations 16 and 17 visible through pawl portions 24 and 27 of exposure windows 25 and 28 respectively. This same appearance is likewise presented if the magazine is viewed at any time when an area of film between slots 18 and 19 is aligned with the windows, thereby precluding the possibility of visually determining that the film has not been moved in the magazine. With most film magazines it is necessary, prior to observing the film through the exposure windows, to move a shutter member which normally covers the exposure windows when the magazine is removed from the camera. For purposes of simplicity, however, such a shutter member is not illustrated in the accompanying drawings.

If such a magazine, loaded with conventional film, is initially inserted into the camera "second side first," as shown in FIG. 2, the fully wound supply core 12 will be located below the empty take-up core and the film pawl will be in engagement with perforations 17 between slot 19 and the leading end of the film. Operating the camera will now cause pawl 23 to move the film toward the fully wound supply core rather than toward the empty take-up core. After the film has moved only a short distance, further movement thereof will be prevented as the film is pulled taut between the pawl and the empty take-up core. If the film is observed through the exposure windows after such an error has been made, perforations 16 and 17 will be visible in the pawl aperture portions 24 and 27 of windows 25 and 28 respectively as shown in FIG. 4. Since, as previously mentioned, the film as viewed through the exposure windows presents this same appearance before using the magazine and during the use of the magazine except when the magazine is ready to be reversed or processed, the detection of a "second side first" error is likewise not possible by visual inspection without opening the magazine.

The present invention allows either of these errors to be detected by the operator or processor by providing the magazine film 14 with "no run" indicating perforations 21 and "second side first" indicating perforations 22 near the leading end of the film strip and by loading the film into the magazine with perforations 21 located in visible alignment with the exposure windows. If a magazine so loaded with such film is properly installed in a camera as shown in FIG. 1, the pawl 23 will engage perforations 16 and feed the film from the supply core to the take-up core until slot 18 comes into alignment with the pawl. After the magazine is then reversed in the camera, the pawl will engage perforations 17 and return the film to the supply core, stopping when slot 19 is aligned with portion 27 of window 28, before perforations 21 or 22 are again brought into view. At this point the film has been properly exposed and is ready to be processed. If, however, such a magazine is initially installed in the camera "second side first," as shown in FIG. 2, pawl 23, in engagement with perforations 17 will feed the film toward the supply core for only a short distance before the "second side first" indicating perforations 22 are moved into alignment with the magazine windows.

An additional elongated slot 20, provided adjacent perforations 22 prevents further movement of the film by the pawl when these perforations are brought into alignment with the magazine windows. Although the movement of the film could be arrested at this position by unwinding all of the film from the take-up core to which the leading end is attached, the provision of slot 20 eliminates the possibility of tearing the film or pulling it loose from the core.

When the magazine is then removed from the camera after having been loaded "second side first" and run as described above, perforations 22 are visible as shown in FIG. 6. Since these perforations are never brought into alignment with the exposure windows when the magazine is properly installed in the camera, but only appear when a "second side first error" has been made, their appearance in the windows positively indicates to the operator or processor that such an error has occurred. Likewise, the appearance of perforations 21 in the windows, indicates that the film in the magazine remains completely unexposed.

Although only a single perforation 22 adjacent slot 20 is required to enable the occurrence of a "second side first error" to be detected, the provision of the film with a number of such perforations, as shown, performs the additional function of weakening the film in this area in which it is bent in the magazine during storage, to reduce the tendency of the film to retain this bent condition and to therefore wind unevenly on the take-up core. Similarly, the provision of the film with a row of perforations 21, rather than with only those perforations which are actually visible, eliminates the necessity for accurately aligning particular perforations with the windows and permits the film to shift slightly in the magazine without removing the "no run" indicating perforations from view.

As mentioned previously, after having made a "second side first error" with a magazine using conventional film, the operator may correct his error without any loss of film by simply loading the magazine into the camera in the manner specified on the magazine. This is likewise true in the case of magazines loaded with film according to the present invention. When, after having been loaded and run "second side first," the magazine is replaced in the camera as shown in FIG. 1, the pawl will engage perforations 16 and feed the film onto the take-up core until further feeding is prevented by slot 18. Upon reversal of the magazine in the camera, the pawl will engage perforations 17 and feed the film back onto the supply core until slot 19 comes into alignment with the pawl to prevent further feeding.

While the foregoing disclosure relates to a specific embodiment of the invention, various modifications thereof within the scope of the invention will be apparent to one skilled in the art. For example, rather than providing discontinuities in the rows of perforations 16 and 18 by removing the webs between adjacent perforations, the same objective could also be accomplished by leaving an equivalent area unperforated so that the camera pawl would bear against a smooth surface of the film.

The above disclosure is therefore to be considered as illustrative only and not as limiting the scope of the invention, which is defined by the following claims.

We claim:

1. A reversible film magazine adapted for use in a camera having means for advancing film in said magazine in one direction relative to such camera, said magazine comprising: a housing, a film supply core, a film take-up core, and a film strip connected to said cores at opposite ends thereof with the major portion of said film strip initially wound upon said supply core, the proper exposure of said film being effected by first loading said magazine into said camera in a first position in which said film therein is transferred by said film advancing means from said supply core to said take-up core and, after substantially all of said film has been so transferred, by reloading said magazine into said camera in a reversed position in which the film therein is then transferred from said take-up core back to said supply core; said magazine including means defining an indicating position at which an area of said film is visible from the exterior of said magazine: said film strip including first indicating means initially located in view at said indicating position; second indicating means visually distinguishable from said first indicating means and so located as to be brought into view at said indicating position in the event that said magazine is initially improperly loaded into said camera in said second reversed position and the film therein is advanced toward said supply core; first means for stopping the movement of said film when said second indicating means is at said indicating position; and second means spaced from said first means for stopping the movement of said film before either of said indicating means is at said indicating position when said film has been properly exposed.

2. A reversible film magazine adapted for use in a camera having means for advancing film in said magazine in one direction relative to such camera, said magazine comprising: a housing, a film supply core, a film take-up core, and a film strip connected to said cores at opposite ends thereof with the major portion of said film strip initially wound upon said supply core, the proper exposure of said film being effected by first loading said magazine into said camera in a first position in which said film therein is transferred by said film advancing means from said supply core to said take-up core and, after substantially all of said film has been so transferred, by reloading said magazine into said camera in a reversed position in which the film therein is then transferred from said take-up core back to said supply core; said magazine including means defining an indicating position at which an area of said film is visible from the exterior of said magazine: said film strip including indicating means so located as to be brought into view at said indicating position in the event that said magazine is initially improperly loaded into said camera in said second reversed position and the film therein is advanced toward said supply core; first means for stopping the movement of said film when said indicating means is at said indicating position; and second means spaced from said first means for stopping the movement of said film before said indicating means is at said indicating position when said film has been properly exposed.

3. A magazine according to claim 2 in which said indicating means comprises at least one perforation in said film.

4. A magazine according to claim 2 in which said film strip is provided along each edge with a row of uniformly spaced perforations adapted to be engaged by said means for advancing the film and in which at least one of said first and second means comprises a discontinuity in one of said rows of perforations.

5. A film strip according to claim 4 in which said discontinuity comprises an elongated perforation.

6. A film strip according to claim 4 in which said discontinuity comprises an elongated imperforate area.

No references cited.